US008749519B2

(12) United States Patent
 Igeta

(10) Patent No.: US 8,749,519 B2
(45) Date of Patent: Jun. 10, 2014

(54) TOUCH PANEL DEVICE

(75) Inventor: Koichi Igeta, Chiba (JP)

(73) Assignee: Japan Display Inc., Tokyo (JP)

( * ) Notice: Subject to any disclaimer, the term of this patent is extended or adjusted under 35 U.S.C. 154(b) by 283 days.

(21) Appl. No.: 13/401,878

(22) Filed: Feb. 22, 2012

(65) Prior Publication Data

US 2012/0218221 A1   Aug. 30, 2012

(30) Foreign Application Priority Data

Feb. 28, 2011 (JP) .................................. 2011-041240

(51) Int. Cl.
  *G06F 3/045* (2006.01)
(52) U.S. Cl.
  USPC ........................................................ 345/174
(58) Field of Classification Search
  None
  See application file for complete search history.

(56) References Cited

U.S. PATENT DOCUMENTS

2001/0024194 A1*  9/2001  Shigetaka et al. ............ 345/173
2009/0211818 A1*  8/2009  Kondo et al. ............... 178/18.03

FOREIGN PATENT DOCUMENTS

JP              6-35596         2/1994

\* cited by examiner

*Primary Examiner* — Nicholas Lee
(74) *Attorney, Agent, or Firm* — Antonelli, Terry, Stout & Kraus, LLP.

(57) ABSTRACT

A touch panel device comprises a touch panel including a capacitance detecting electrode and a resistance detecting electrode formed in a layer below the capacitance detecting electrode, and a control circuit using detection signals detected by the capacitance detecting electrode or the resistance detecting electrode to calculate a contact position on an input surface of the input area. The capacitance detecting electrode includes horizontal capacitance detecting electrodes and vertical capacitance detecting electrodes. A control circuit includes a contact position information generating section which uses detection signals to calculate one or more contact positions and generates information of large/small pressing force at the calculated contact position. With this configuration, it is possible to generate information of large/small pressing force at a contact position, and even when an input surface is contacted simultaneously at plural points, each of the contact positions can be calculated.

6 Claims, 8 Drawing Sheets

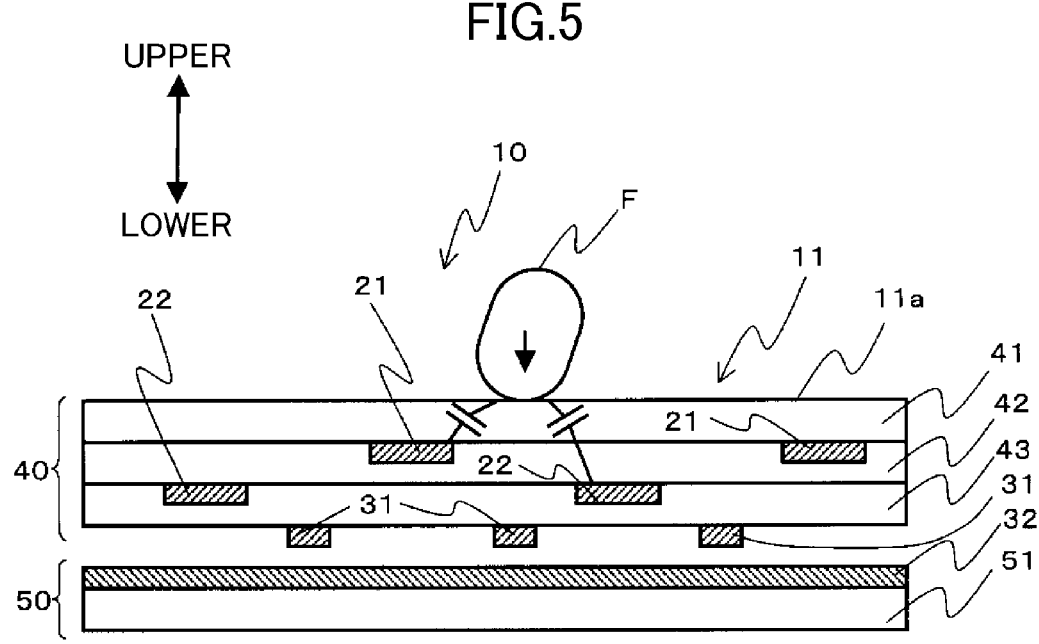
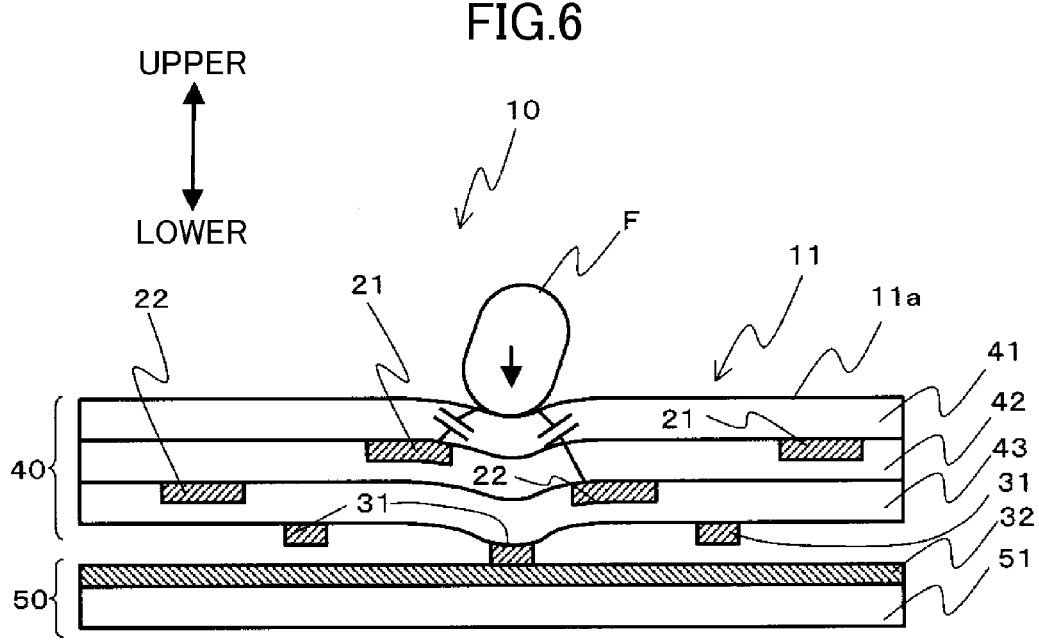

TOUCH PANEL DEVICE

CROSS-REFERENCE TO RELATED APPLICATION

The present application claims priority from Japanese application JP2011-041240 filed on Feb. 28, 2011, the content of which is hereby incorporated by reference into this application.

BACKGROUND OF THE INVENTION

1. Field of the Invention

The present invention relates to a touch panel device in which detection signals detected by a capacitance detecting electrode or a resistance detecting electrode are used to calculate a contact position on an input surface.

2. Description of the Related Art

In the related art, plural systems, such as for example an electrostatic capacitance system or a resistive film system, have been used for touch panels. A touch panel of the electrostatic capacitance system has an advantage that detection is possible only by touching with a finger, while having a drawback that erroneous detection is likely to occur. On the other hand, the resistive film system has an advantage that erroneous detection is not likely to occur because a user has to press the touch panel with the addition of a load, while having a drawback that the detection sensitivity is low. In this manner, since these systems have different advantages and drawbacks, the systems have been used separately depending on the intended use. Under such circumstances, JP 6-35596 A (Patent Document 1) discloses a touch panel in which these system are combined together.

SUMMARY OF THE INVENTION

The touch panel disclosed in Patent Document 1 is configured such that a high-pressure-sensitive sensor plate which detects a position through high pressure contact with a pen is formed integrally with a low-pressure-sensitive sensor plate which detects a position through low pressure contact with a finger or the like, by using an upper surface of the low-pressure-sensitive sensor plate. The touch panel detects whether the finger or pen is strongly pressed against an input surface or softly contacts the input surface.

However, in the touch panel disclosed in Patent Document 1, a resistance film as detecting means is formed extending in a planar shape to detect a single contact position. Therefore, when the input surface is contacted simultaneously at plural points, the plural contact positions cannot be calculated.

The invention has been made in view of the above, and it is an object of the invention to provide a touch panel device which can generate information of large/small pressing force at a contact position and calculate, even when an input surface is contacted simultaneously at plural points, each of the contact positions.

For solving the problem described above and achieving the object, a touch panel device according to an aspect of the invention includes: a touch panel including, in an input area, a capacitance detecting electrode and a resistance detecting electrode formed in a layer below the capacitance detecting electrode; and a control circuit using detection signals detected by the capacitance detecting electrode or the resistance detecting electrode to calculate a contact position on an input surface of the input area, wherein the capacitance detecting electrode includes horizontal capacitance detecting electrodes arranged in parallel in the vertical direction of the input area and each having plural first planar portions arranged in parallel in the horizontal direction and a straight-line-shaped first coupling portion coupling the first planar portions, and vertical capacitance detecting electrodes disposed in a layer different from that of the horizontal capacitance detecting electrode, arranged in parallel in the horizontal direction, and each having, in a view of the input surface, plural second planar portions arranged in parallel in the vertical direction at positions not overlapping the first planar portions and a straight-line-shaped second coupling portion coupling the second planar portions, the resistance detecting electrode includes resistance detecting linear electrodes having, in the view of the input surface, a lattice shape in which each of the resistance detecting linear electrodes passes between the first planar portions and the second planar portions in the input area, and the control circuit includes a contact position information generating section which uses the detection signals to calculate one or more contact positions and generates information of large/small pressing force at the calculated contact position.

In the touch panel device according to the aspect of the invention, the control circuit sets, in a contact position calculated using detection signals detected by the capacitance detecting electrode and a contact position calculated using detection signals detected by the resistance detecting electrode, the contact position calculated using detection signals detected by the capacitance detecting electrode as contact position information to be output to a destination.

Moreover, in the touch panel device according to the aspect of the invention, the resistance detecting electrode includes a light-transmissive resistance detecting planar electrode arranged below the resistance detecting linear electrodes so as to face the resistance detecting linear electrodes and formed to have a planar shape.

Moreover, in the touch panel device according to the aspect of the invention, the first planar portion and the second planar portion each have a diamond shape, the horizontal capacitance detecting electrodes and the vertical capacitance detecting electrodes are arranged such that in the view of the input surface, a side of the first planar portion and a side of the second planar portion face each other, and the resistance detecting linear electrodes are each arranged, in the view of the input surface, so as to pass between the facing sides of the first planar portion and the second planar portion adjacent to each other.

Moreover, in the touch panel device according to the aspect of the invention, the resistance detecting linear electrode is formed of a metal material.

Moreover, in the touch panel device according to the aspect of the invention, the contact position information generating section generates group information in which the detection signals by means of which the same contact position is calculated are made into one group, refers to the group information to determine whether or not detection signals through the resistance detecting electrode are present in each group, generates large-pressing force information indicating that a pressing force is large if detection signals through the resistance detecting electrode are present, and generates small-pressing force information indicating that a pressing force is small if detection signals through the resistance detecting electrode are not present.

The touch panel device according to the aspect of the invention is configured as follows. The capacitance detecting electrode includes the horizontal capacitance detecting electrodes arranged in parallel in the vertical direction of the input area and each having the plural first planar portions arranged in parallel in the horizontal direction and the first coupling portion each coupling the first planar portions, and the vertical capacitance detecting electrodes arranged in parallel in the horizontal direction and each having the plural second planar portions arranged in parallel in the vertical direction at positions not overlapping the first planar portions and the second coupling portion coupling the second planar portions. The resistance detecting electrode includes the resistance detecting linear electrodes having a lattice shape in which each of the resistance detecting linear electrodes passes between the first planar portions and the second planar portions. The control circuit includes the contact position information generating section which uses detection signals to calculate one or more contact positions and generates information of large/small pressing force at each of the calculated contact positions. Therefore, it is possible to generate information of large/small pressing force at a contact position, and even when the input surface is contacted simultaneously at plural points, each of the contact positions can be calculated.

BRIEF DESCRIPTION OF THE DRAWINGS

FIG. 5 explains a state where resistance detecting linear electrodes do not contact a resistance detecting planar electrode at a contact position on the touch panel shown in FIG. 1.

FIG. 6 explains a state where the resistance detecting linear electrode contacts the resistance detecting planar electrode at the contact position on the touch panel shown in FIG. 1.

DETAILED DESCRIPTION OF THE INVENTION

Hereinafter, a preferred embodiment of a touch panel device according to the invention will be described in detail with reference to the drawings.

Figure 1:
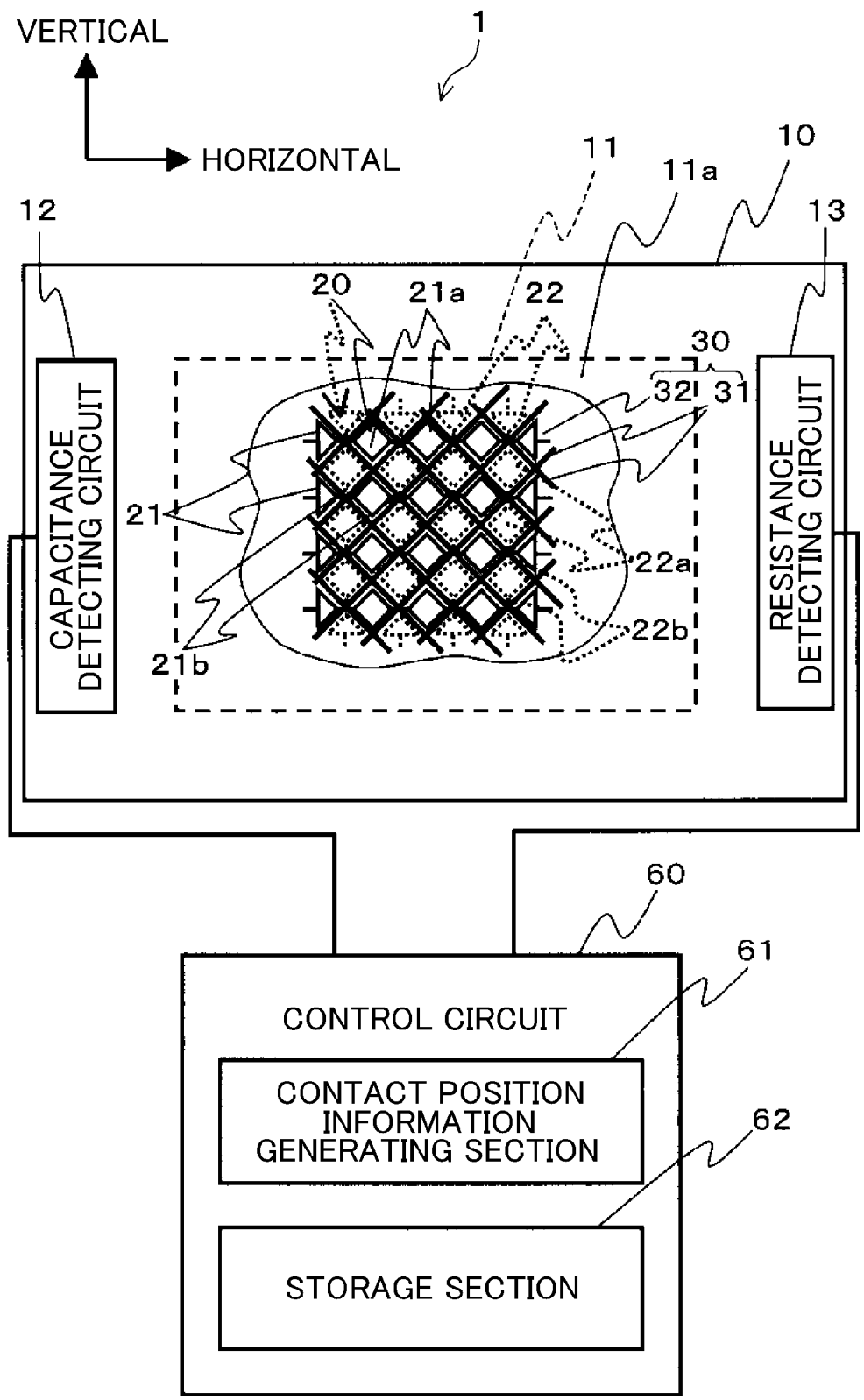
FIG. 1 is a schematic view of a touch panel device according to an embodiment of the invention.
Figure 2:
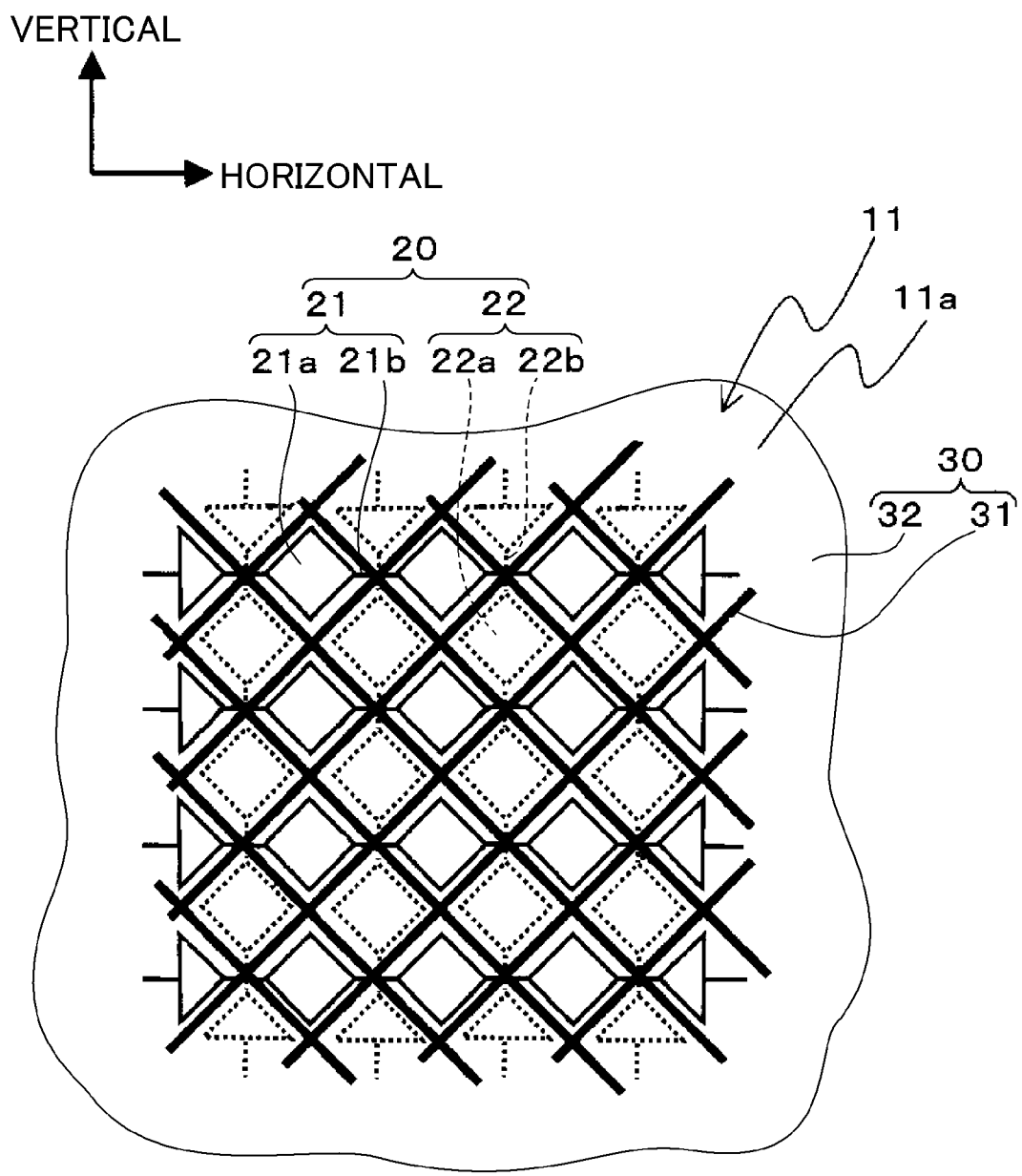
FIG. 2 is an enlarged view of a main portion of an input area shown in FIG. 1.
Figure 3:
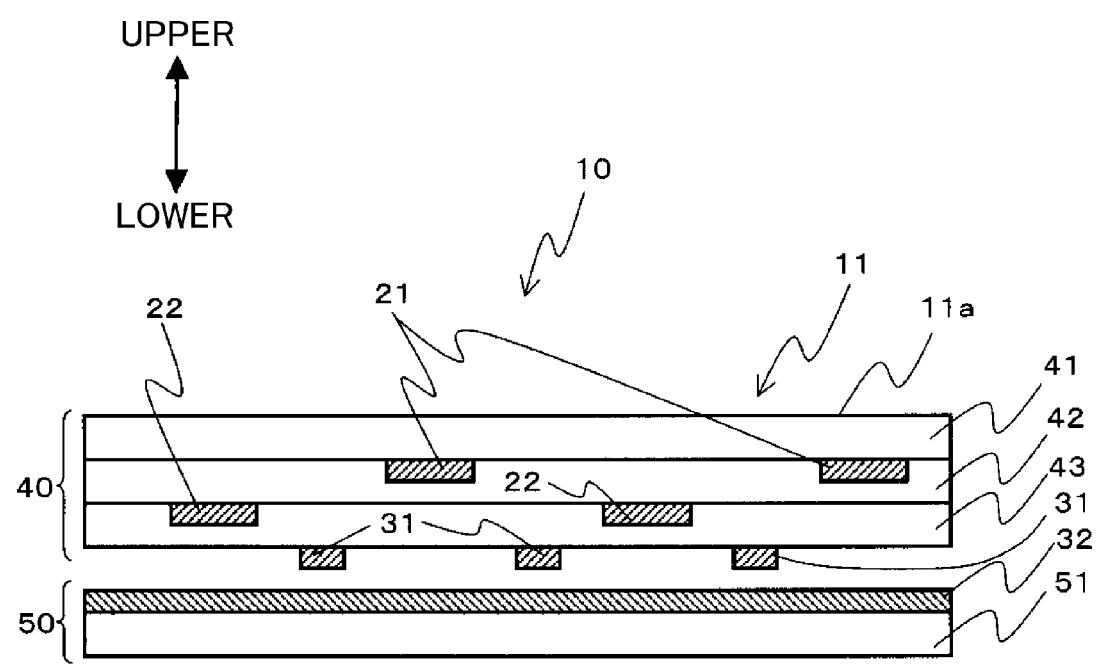
FIG. 3 is a cross-sectional view of a main portion of a touch panel shown in FIG. 1.
Figure 4:
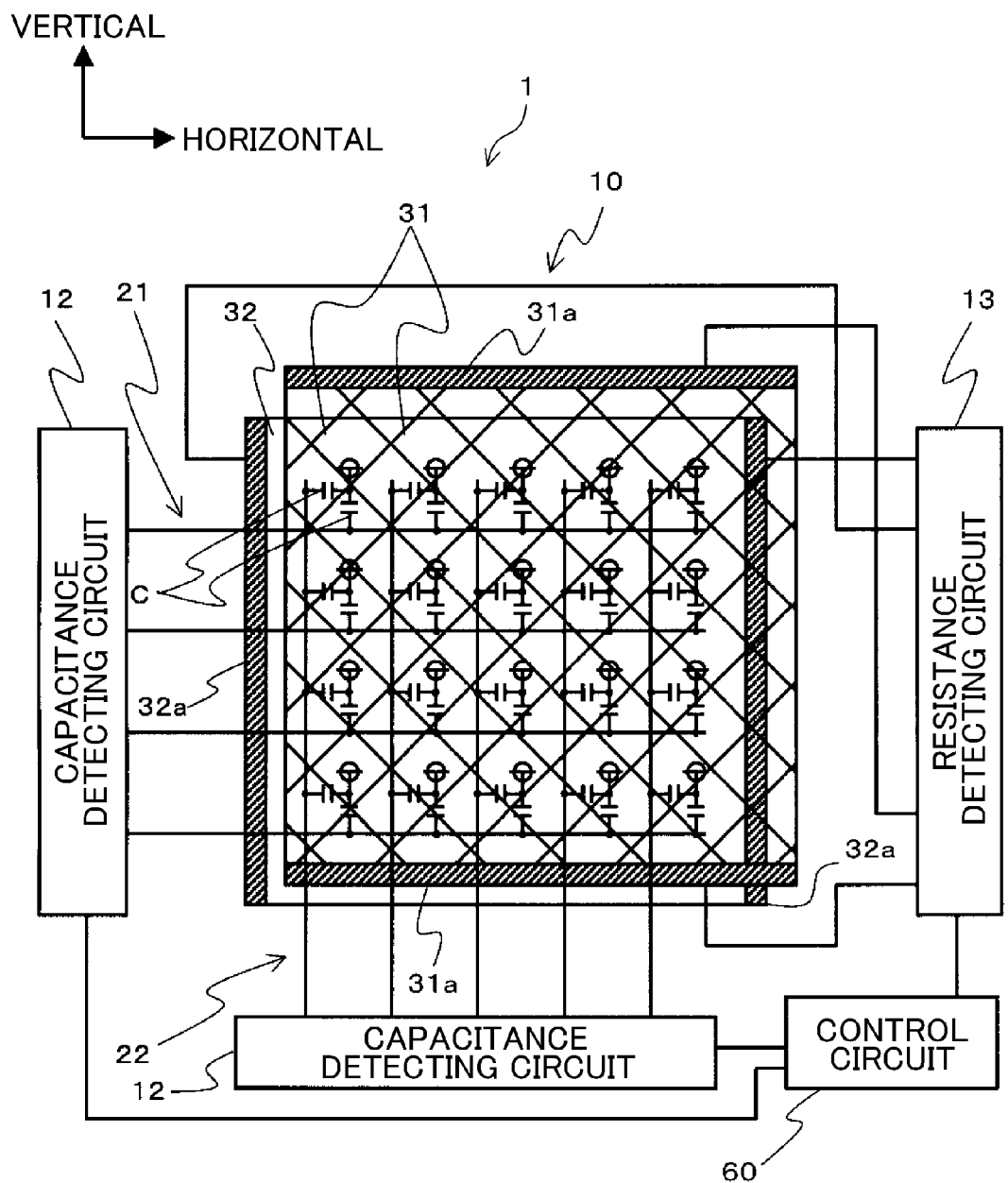
FIG. 4 explains a circuit configuration of the touch panel device shown in FIG. 1.

FIG. 1 is a schematic view of a touch panel device 1 according to the embodiment of the invention. FIG. 2 is an enlarged view of a main portion of an input area 11 shown in FIG. 1. FIG. 3 is a cross-sectional view of a main portion of a touch panel 10 shown in FIG. 1. FIG. 4 explains a circuit configuration of the touch panel device 1 shown in FIG. 1. FIG. 5 explains a state where resistance detecting linear electrodes 31 do not contact a resistance detecting planar electrode 32 at a contact position on the touch panel 10 shown in FIG. 1. FIG. 6 explains a state where the resistance detecting linear electrode 31 contacts the resistance detecting planar electrode 32 at the contact position on the touch panel 10 shown in FIG. 1. For convenience sake, the vertical and horizontal directions and the upper and lower directions are indicated by the arrows in the drawings. The touch panel device 1 includes the touch panel 10 assembled on the display surface of a display device (not shown) and a control circuit 60 which controls operation of the touch panel 10.

The touch panel 10 will be first described. The touch panel 10 includes the input area 11, a capacitance detecting circuit 12, and a resistance detecting circuit 13. The input area 11 is a two-dimensional plane area in which a user performs an input manipulation by contacting the area with his/her finger or the like, and the surface of the input area serves as an input surface 11a. In the input area 11, a capacitance detecting electrode 20 and a resistance detecting electrode 30 are disposed. The capacitance detecting electrode 20 is an electrode disposed in the two-dimensional plane of the input area 11 for the capacitance detecting circuit 12 to detect a change in electrostatic capacitance in the two-dimensional plane of the input area 11. The capacitance detecting electrode 20 includes plural horizontal capacitance detecting electrodes 21 and plural vertical capacitance detecting electrodes 22.

The horizontal capacitance detecting electrodes 21 are arranged in parallel in the vertical direction of the input area 11 and each include plural diamond-shaped first planar portions 21a arranged in parallel in the horizontal direction and straight-line-shaped first coupling portions 21b each coupling the first planar portions 21a. The vertical capacitance detecting electrodes 22 are disposed in a layer different from that of the horizontal capacitance detecting electrode 21 and arranged in parallel in the horizontal direction. Each of the vertical capacitance detecting electrodes 22 include, in a view of the input surface 11a, plural diamond-shaped second planar portions 22a arranged in parallel in the vertical direction at positions not overlapping the first planar portions 21a, and straight-line-shaped second coupling portions 22b each coupling the second planar portions 22a. More specifically, the horizontal capacitance detecting electrodes 21 and the vertical capacitance detecting electrodes 22 are arranged such that in the view of the input surface 11a, a side of the first planar portion 21a and a side of the second planar portion 22a face each other.

The resistance detecting electrode 30 is an electrode disposed in the two-dimensional plane of the input area 11 for the resistance detecting circuit 13 to detect a change in voltage by means of resistance values in the two-dimensional plane of the input area 11. The resistance detecting electrode 30 includes the resistance detecting linear electrodes 31 and the resistance detecting planar electrode 32. The resistance detecting linear electrode 31 is a metal wire disposed, in the view of the input surface 11a, to extend in the vertical or horizontal direction between the first planar portion 21a and the second planar portion 22a in the input area 11. More specifically, the resistance detecting linear electrodes 31 form, in the view of the input surface 11a, a lattice shape in which each of the resistance detecting linear electrodes 31 passes between the facing sides of the first planar portion 21a and the second planar portion 22a adjacent to each other.

In this manner, the resistance detecting linear electrode 31 is disposed so as to thread its way between the first planar portion 21a and the second planar portion 22a. Therefore, even when the resistance detecting linear electrode 31 is a metal wire, it is possible to prevent the attenuation of light transmitted from a display screen of the display device (not shown) to which the touch panel 10 is assembled. Moreover, since the resistance detecting linear electrode 31 is formed of a metal material, the resistance detecting linear electrode 31 is high in strength compared to a light-transmissive conductive material such as ITO (Indium Tin Oxide). The material of the resistance detecting linear electrode 31 is not limited to a metal material, but a light-transmissive conductive material such as ITO may be used. In this case, it is possible to reduce the attenuation of the light transmitted from the display screen of the display device (not shown) to which the touch panel 10 is assembled, compared to a metal material.

The resistance detecting planar electrode 32 is formed of a light-transmissive conductive material such as ITO. The resistance detecting planar electrode 32 is arranged below the resistance detecting linear electrode 31 so as to face the resistance detecting linear electrode 31 and formed to have a planar shape.

The capacitance detecting circuit 12 and the resistance detecting circuit 13 will be next described. The capacitance detecting circuit 12, which is disposed at the peripheral edge of the touch panel 10, detects signals from the capacitance detecting electrode 20. When the capacitance detecting circuit 12 detects a change in electrostatic capacitance in the two-dimensional plane of the input area 11, the capacitance detecting circuit 12 outputs signals of the detection to the control circuit 60. The resistance detecting circuit 13, which is disposed at the peripheral edge of the touch panel 10, detects signals from the resistance detecting electrode 30. When the resistance detecting circuit 13 detects a change in voltage by means of resistance values in the two-dimensional plane of the input area 11, the resistance detecting circuit 13 outputs signals of the detection to the control circuit 60.

The control circuit 60 will be next described. As shown in FIG. 1, the control circuit 60 is connected to the capacitance detecting circuit 12 and the resistance detecting circuit 13 of the touch panel 10 and the display device (not shown), to control operation of each of the portions. The control circuit 60 uses the detection signals detected by the capacitance detecting circuit 12 or the resistance detecting circuit 13, that is, the detection signals detected by the capacitance detecting electrode 20 or the resistance detecting electrode 30 to calculate one or more contact positions on the input surface 11a, and outputs information of the calculated contact position to the display device (not shown).

Here, a cross-sectional configuration of the touch panel 10 will be described with reference to FIG. 3. For convenience sake, the arrows in the drawing indicate the upper and lower directions. As shown in FIG. 3, the touch panel 10 includes an upper substrate 40 and a lower substrate 50 bonded together via a predetermined gap with spacers (not shown). The upper substrate 40 has the horizontal capacitance detecting electrodes 21 formed on a lower surface of a first substrate 41 formed of a film made of, for example, polyethylene terephthalate. On the lower surface of the first substrate 41 on which the horizontal capacitance detecting electrodes 21 are formed, a first insulating film 42 is formed. On a lower surface of the first insulating film 42, the vertical capacitance detecting electrodes 22 are formed. On the lower surface of the first insulating film 42 on which the vertical capacitance detecting electrodes 22 are formed, a second insulating film 43 is formed. On a lower surface of the second insulating film 43, the resistance detecting linear electrodes 31 are formed.

On the other hand, the lower substrate 50 has the resistance detecting planar electrode 32 formed on an upper surface of a second substrate 51 formed of a light-transmissive insulating substrate made of glass or the like.

An overall configuration of the touch panel device 1 will be next described in detail with reference to FIG. 4. In the touch panel 10, a capacitance C is formed between the horizontal capacitance detecting electrode 21 and the vertical capacitance detecting electrode 22. When a conductor such as a finger contacts the input surface 11a through an input manipulation by a user, an electrostatic capacitance caused by the horizontal capacitance detecting electrode 21 and the vertical capacitance detecting electrode 22 coupled via a finger surface is formed in parallel to the original capacitance between the electrodes in the vicinity of the contact position, thereby resulting in an increase in an electrostatic capacitance. The capacitance detecting circuit 12 detects the change in capacitance, and the control circuit 60 calculates the contact position based on the detected detection signals. When the input surface 11a is contacted simultaneously at plural points, the control circuit 60 uses the detection signals (hereinafter referred to as capacitance detection signals) detected by the capacitance detecting circuit 12 to calculate plural contact positions.

Moreover, the touch panel 10 includes first electrodes 31a connected to the resistance detecting linear electrodes 31, and second electrodes 32a arranged in a direction perpendicular to the first electrodes 31a and connected to the resistance detecting planar electrode 32. A voltage is applied alternately to the first electrodes 31a and the second electrodes 32a.

When a finger or the like contacts the input surface 11a through an input manipulation by a user and the upper substrate is bent downward at the contact position, the resistance detecting linear electrode 31 contacts the resistance detecting planar electrode 32. In this case, when a voltage is being applied to the first electrodes 31a, the voltage is divided at the contact position and the resistance detecting circuit 13 detects the change in voltage by means of resistance values on the ordinate. On the other hand, when a voltage is being applied to the second electrodes 32a, the voltage is divided at the contact position and the resistance detecting circuit 13 detects the change in voltage by means of resistance values on the abscissa. Based on the detected signals, the control circuit 60 calculates the contact position.

One contact position is calculated using the detection signals (hereinafter referred to as resistance detection signals) detected by the resistance detecting circuit 13. Therefore, even when the resistance detecting linear electrodes 31 contact the resistance detecting planar electrode 32 simultaneously at plural points on the input surface 11a, one contact position is calculated using the resistance detection signals.

In the touch panel device 1 described above, when a pressing force at a contact position is small in an input manipulation by a user s finger F, the resistance detecting linear electrode 31 does not contact the resistance detecting planar electrode 32 as shown in FIG. 5. In this case, while signals are detected by the capacitance detecting circuit 12, signals are not detected by the resistance detecting circuit 13. Therefore, when a pressing force at a contact position is small, the control circuit 60 uses only capacitance detection signals to calculate the contact position.

On the other hand, when a pressing force at a contact position is large, that is, when such a pressing force that the resistance detecting linear electrode 31 contacts the resistance detecting planar electrode 32 is loaded to the input surface 11a, signals are detected by the capacitance detecting circuit 12 and the resistance detecting circuit 13 as shown in FIG. 6. Therefore, when a pressing force at a contact position is large, the control circuit 60 uses detection signals through the capacitance detecting circuit 12 or detection signals trough the resistance detecting circuit 13 to calculate the contact position.

That is, when a pressing force at a contact position is small, the control circuit 60 uses the detection signals detected only by the capacitance detecting circuit 12 to calculate the contact position. On the other hand, when a pressing force at a contact position is large, the control circuit 60 uses the respective detection signals detected by the capacitance detecting circuit 12 and the resistance detecting circuit 13 to calculate the contact position. In this case, two contact positions are calculated by the control circuit 60, and the calculated two contact positions are substantially equal to each other. Therefore, the value of a contact position calculated using, for example, capacitance detection signals is used. In this case, the value of a contact position calculated using resistance detection signals may be used, or the averaged value of the contact positions calculated using the resistance detection signals and the capacitance detection signals may be used.

The control circuit 60 will be described further in detail. The control circuit 60 includes a contact position information generating section 61 and a storage section 62. The contact position information generating section 61 uses detection signals detected by the capacitance detecting electrode 20 and the resistance detecting electrode 30 to calculate one or more contact positions, and generates information of large/small pressing force at the calculated contact position.

In the embodiment, the control circuit 60 performs such a process that in contact positions calculated using resistance detection signals, a contact position different from that calculated using capacitance detection signals is not used. That is, the control circuit 60 performs a process for setting a contact position calculated using capacitance detection signals as contact position information to be output to the display device (not shown).

The storage section 62, which is realized by a memory or the like which electrically stores information, stores information on the process of the control circuit 60. The control circuit 60 described above outputs, to the display device (not shown), information obtained by adding information of large/small pressing force to each of one or more pieces of calculated contact position information.

Figure 7:
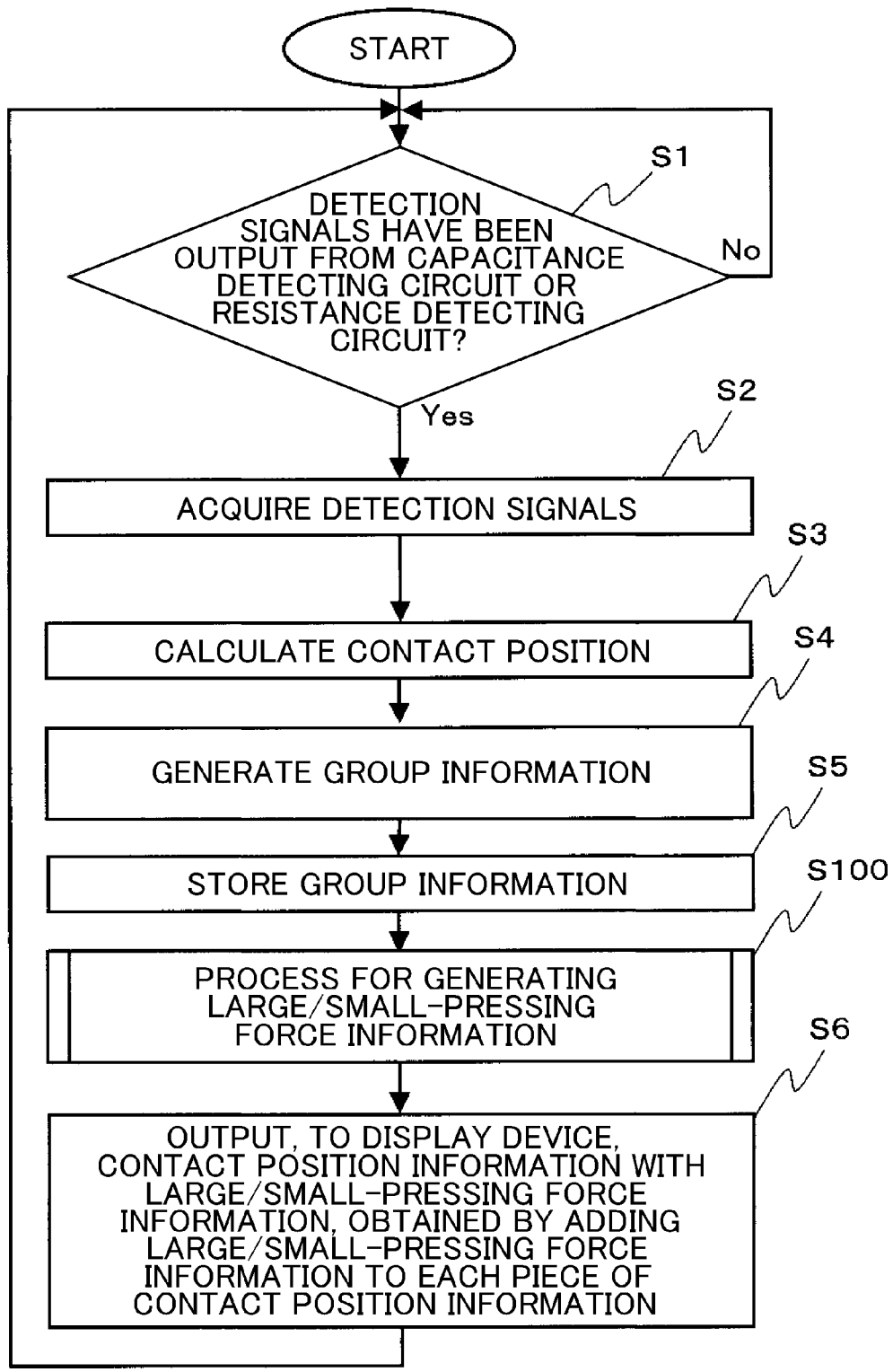
FIG. 7 is a main flowchart diagram showing the flow of a process for adding large/small-pressing force information to contact position information performed by a control circuit.
Figure 8:
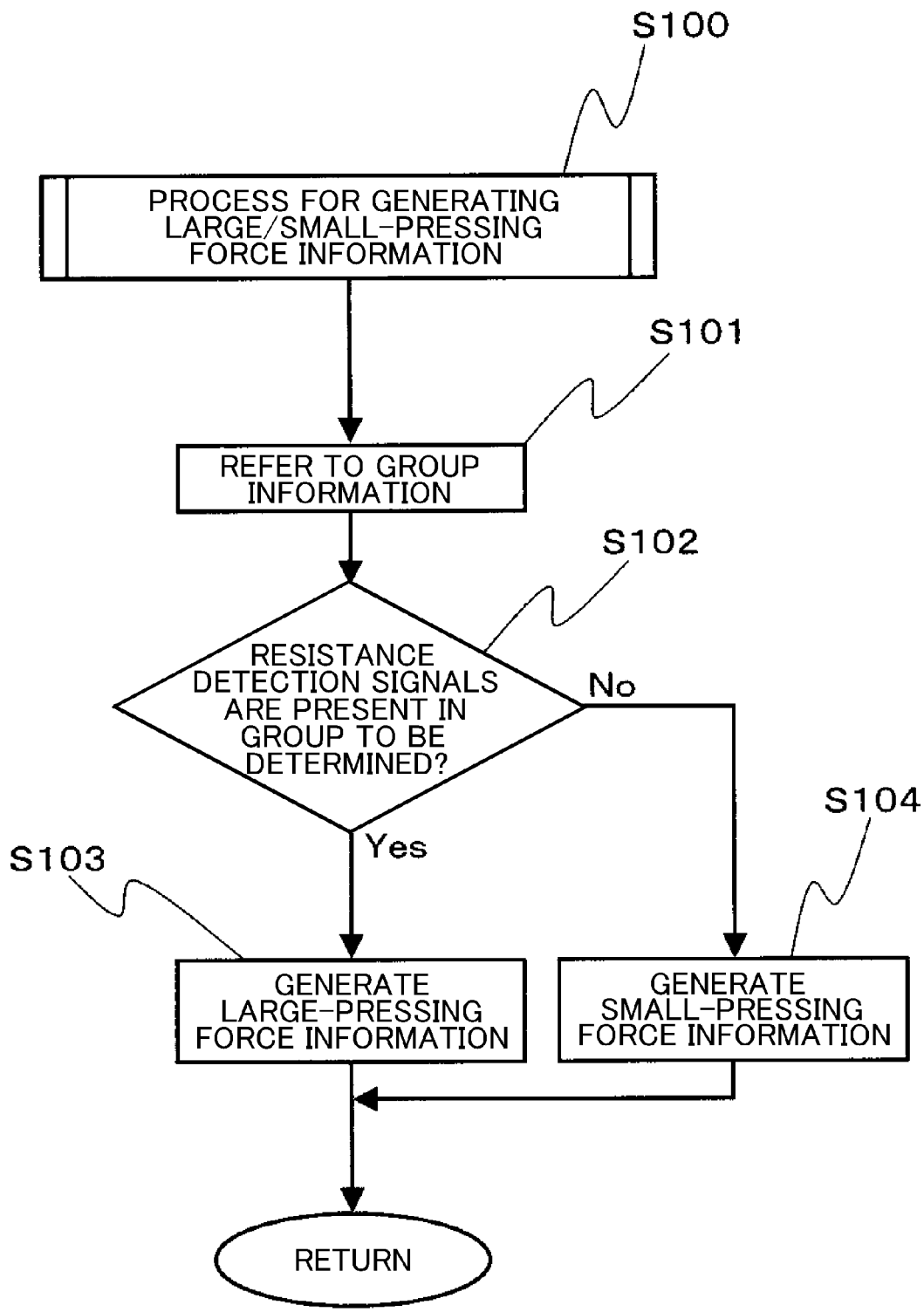
FIG. 8 is a flowchart diagram showing the flow of a process for generating large/small-pressing force information shown in FIG. 7.

With reference to FIGS. 7 and 8, the flow of a process for adding large/small-pressing force information to contact position information performed by the control circuit 60 will be next described. FIG. 7 is a main flowchart diagram showing the flow of the process for adding large/small-pressing force information to contact position information performed by the control circuit 60. FIG. 8 is a flowchart diagram showing the flow of a process for generating large/small-pressing force information shown in FIG. 7.

As shown in FIG. 7, the control circuit 60 first determines whether or not detection signals have been output from the capacitance detecting circuit 12 or the resistance detecting circuit 13 (Step S1). When determining that detection signals have been output from the capacitance detecting circuit 12 or the resistance detecting circuit 13 (Yes in Step S1), the control circuit 60 acquires the output detection signals (Step S2). Thereafter, the control circuit 60 performs the calculation of a contact position based on the acquired detection signals (Step S3).

Thereafter, the control circuit 60 generates group information obtained by grouping the detection signals (Step S4). More specifically, the control circuit 60 defines a detection signal group by means of which the same contact position is calculated as one group to divide the detection signals acquired in Step S2 into groups, thereby generating the group information. In the process for generating the group information, such a process that in contact positions calculated using resistance detection signals, a contact position different from that calculated using capacitance detection signals is not used is performed. Thereafter, the control circuit 60 stores the group information generated in Step S4 in the storage section 62 (Step S5), and proceeds to the process for generating large/small-pressing force information (Step S100) (refer to FIG. 8).

In the process for generating large/small-pressing force information (Step S100), the control circuit 60 first refers to the group information stored in the storage section 62 (Step S101). Thereafter, the control circuit 60 determines for each group whether or not resistance detection signals are present (Step S102). This determining process is a process for determining, for each calculated contact position, whether or not the calculated contact position is a contact position calculated using resistance detection signals, that is, whether or not a pressing force at the contact position is large. If resistance detection signals are present in a group to be determined (Yes in Step S102), the control circuit 60 generates large-pressing force information indicating that a pressing force at a contact position corresponding to the group is large (Step S103), and returns the process for generating large/small-pressing force information. On the other hand, if resistance detection signals are not present in the group to be determined (No in Step S102), the control circuit 60 generates small-pressing force information indicating that the pressing force is small (Step S104), and returns the process for generating large/small-pressing force information.

Thereafter, in Step S6 as shown in FIG. 7, the control circuit 60 outputs, to the display device (not shown), contact position information with the large/small-pressing force information, obtained by adding the large/small-pressing force information to each piece of the calculated contact position information (Step S6). Thereafter, the control circuit 60 returns the process to Step S1, and then repeats the process described above. In Step S1, if it is determined that detection signals are not output from the capacitance detecting circuit 12 or the resistance detecting circuit 13 (No in Step S1), the control circuit 60 repeats this determining process.

The touch panel device 1 according to the embodiment of the invention is configured as follows. The capacitance detecting electrode 20 includes the horizontal capacitance detecting electrodes 21 arranged in parallel in the vertical direction of the input area 11 and each having the plural first planar portions 21*a* arranged in parallel in the horizontal direction and the first coupling portions 21*b* each coupling the first planar portions 21*a*, and the vertical capacitance detecting electrodes 22 arranged in parallel in the horizontal direction and each having the plural second planar portions 22*a* arranged in parallel in the vertical direction at positions not overlapping the first planar portions 21*a* and the second coupling portions 22*b* each coupling the second planar portions 22*a*. The resistance detecting electrode 30 includes the resistance detecting linear electrodes 31 having a lattice shape in which each of the resistance detecting linear electrodes passes between the first planar portions 21*a* and the second planar portions 22*a*. The control circuit 60 includes the contact position information generating section 61 which uses detection signals to calculate one or more contact positions and generates information of large/small pressing force at each of the calculated contact positions. Therefore, it is possible to generate information of large/small pressing force at a contact position, and even when the input surface 11*a* is contacted simultaneously at plural points, each of the contact positions can be calculated.

Moreover, in the touch panel device 1 according to the embodiment of the invention, the control circuit 60 sets, in a contact position calculated using capacitance detection signals and a contact position calculated using resistance detection signals, the contact position calculated using capacitance detection signals as contact position information to be output to a destination. That is, when there are plural contact points at which a pressing force is large, the control circuit 60 does not set the contact position calculated using resistance detection signals as contact position information to be output to a destination. Therefore, even when the input surface 11*a* is contacted simultaneously at plural points, the contact positions can be precisely calculated.

Moreover, in the touch panel device 1 according to the embodiment of the invention, the first planar portion 21a and the second planar portion 22a each have a diamond shape, the horizontal capacitance detecting electrodes 21 and the vertical capacitance detecting electrodes 22 are arranged such that in the view of the input surface 11a, a side of the first planar portion 21a and a side of the second planar portion 22a face each other, and the resistance detecting linear electrodes 31 are arranged, in the view of the input surface 11a, so as to pass between the facing sides of the first planar portion 21a and the second planar portion 22a adjacent to each other. Therefore, the horizontal capacitance detecting electrodes 21, the vertical capacitance detecting electrodes 22, and the resistance detecting linear electrodes 31 can be effectively arranged in the two-dimensional plane of the input area 11 without gaps. As a result, a contact position can be accurately calculated.

Moreover, in the touch panel device 1 according to the embodiment of the invention, the resistance detecting linear electrode 31 is formed of a metal material, and therefore has high strength compared to a light-transmissive conductive material such as ITO.

Figure 9:
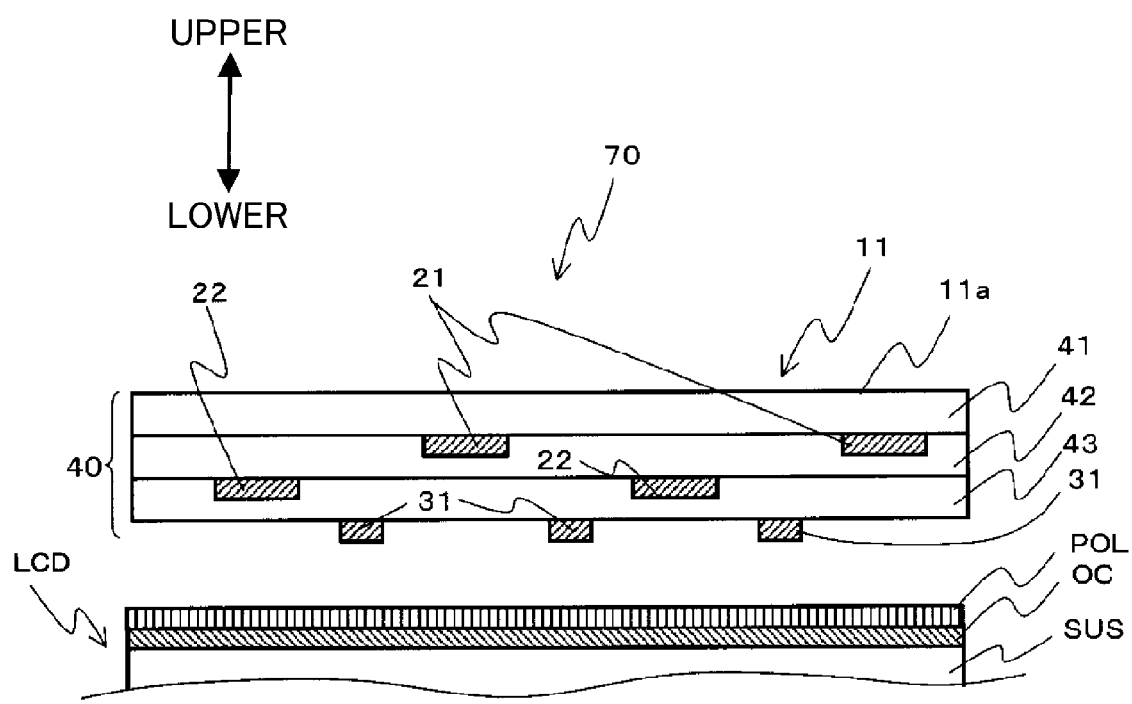
FIG. 9 shows a modified example of the touch panel of the embodiment of the invention.

A modified example of the touch panel device 1 according to the embodiment of the invention will be described with reference to FIG. 9. FIG. 9 shows the modified example of the touch panel device 1 according to the embodiment of the invention. Portions having the same configuration as those of the embodiment are denoted by the same reference and numeral signs. As shown in FIG. 9, a touch panel device of the modified example includes a touch panel 70 instead of the touch panel 10. The touch panel 70 is assembled to a liquid crystal display device LCD including, on the side of a display surface, a light-transmissive transparent conductive film OC having a planar shape.

In this case, the touch panel 70 can use the transparent conductive film OC formed between a glass substrate SUS and a polarizer POL of the liquid crystal display device LCD instead of the resistance detecting planar electrode 32. More specifically, the touch panel 70 is configured such that the glass substrate SUS is used instead of the second substrate 51 of the touch panel 10 of the embodiment, and that the transparent conductive film OC is used instead of the resistance detecting planar electrode 32. Therefore, the touch panel device including the touch panel 70 according to the modified example can provide the same advantageous effects as those of the touch panel device 1 of the embodiment and simplify the device configuration.

Although, in the touch panel device 1 according to the embodiment of the invention, the first planar portion 21a and the second planar portion 22a each having a diamond shape are exemplified, the invention is not limited to this. For example, the first planar portion 21a and the second planar portion 22a each having a circular shape may be used.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A touch panel device comprising:
   a touch panel including, in an input area, a capacitance detecting electrode and a resistance detecting electrode formed in a layer below the capacitance detecting electrode; and
   a control circuit using detection signals detected by the capacitance detecting electrode or the resistance detecting electrode to calculate a contact position on an input surface of the input area, wherein
   the capacitance detecting electrode includes
      horizontal capacitance detecting electrodes arranged in parallel in the vertical direction of the input area and each having a plurality of first planar portions arranged in parallel in the horizontal direction and a straight-line-shaped first coupling portion coupling the first planar portions, and
      vertical capacitance detecting electrodes disposed in a layer different from that of the horizontal capacitance detecting electrode, arranged in parallel in the horizontal direction, and each having, in a view of the input surface, a plurality of second planar portions arranged in parallel in the vertical direction at positions not overlapping the first planar portions and a straight-line-shaped second coupling portion coupling the second planar portions,
   the resistance detecting electrode includes resistance detecting linear electrodes having, in the view of the input surface, a lattice shape in which each of the resistance detecting linear electrodes passes between the first planar portions and the second planar portions in the input area, and
   the control circuit includes a contact position information generating section which uses the detection signals to calculate one or more contact positions and generates information of large/small pressing force at the calculated contact position.

2. The touch panel device according to claim 1, wherein the control circuit sets, in a contact position calculated using detection signals detected by the capacitance detecting electrode and a contact position calculated using detection signals detected by the resistance detecting electrode, the contact position calculated using detection signals detected by the capacitance detecting electrode as contact position information to be output to a destination.

3. The touch panel device according to claim 1, wherein the resistance detecting electrode includes a light-transmissive resistance detecting planar electrode arranged below the resistance detecting linear electrodes so as to face the resistance detecting linear electrodes and formed to have a planar shape.

4. The touch panel device according to claim 1, wherein the first planar portion and the second planar portion each have a diamond shape,
   the horizontal capacitance detecting electrodes and the vertical capacitance detecting electrodes are arranged such that in the view of the input surface, a side of the first planar portion and a side of the second planar portion face each other, and
   the resistance detecting linear electrodes are each arranged, in the view of the input surface, so as to pass between the first planar portion and the second planar portion adjacent to each other.

5. The touch panel device according to claim 1, wherein the resistance detecting linear electrode is formed of a metal material.

6. The touch panel device according to claim 1, wherein the contact position information generating section generates group information in which the detection signals by means of which the same contact position is calculated are made into one group, refers to the group information to determine whether or not detection signals through the resistance detecting electrode are present in each group, generates large-pressing force information indicating that a pressing force is large if detection signals through the resistance detecting electrode are present, and generates small-pressing force information indicating that a pressing force is small if detection signals through the resistance detecting electrode are not present.

\* \* \* \* \*